US006871510B2

United States Patent
Haas

(10) Patent No.: US 6,871,510 B2
(45) Date of Patent: Mar. 29, 2005

(54) AIR CONDITIONING SYSTEM

(75) Inventor: Joachim Haas, Wangen (DE)

(73) Assignee: Liebherr-Aerospace Lindenberg GmbH, Lindenberg/Allgau (DE)

(*) Notice: Subject to any disclaimer, the term of this patent is extended or adjusted under 35 U.S.C. 154(b) by 119 days.

(21) Appl. No.: 10/217,047

(22) Filed: Aug. 12, 2002

(65) Prior Publication Data
US 2003/0084681 A1 May 8, 2003

(30) Foreign Application Priority Data
Aug. 10, 2001 (DE) .......................... 101 39 483

(51) Int. Cl.[7] .............................................. F25D 9/00
(52) U.S. Cl. .......................................... 62/402; 62/415
(58) Field of Search ............................. 62/87, 88, 402, 62/415

(56) References Cited

U.S. PATENT DOCUMENTS

| 4,550,573 | A | * | 11/1985 | Rannenberg | ................. | 62/172 |
| RE32,100 | E | * | 4/1986 | Rannenberg | ................. | 62/80 |
| 5,086,622 | A | * | 2/1992 | Warner | ................. | 62/88 |
| 5,704,218 | A | | 1/1998 | Christians et al. | | |
| 5,887,445 | A | | 3/1999 | Murry et al. | | |
| 6,070,418 | A | | 6/2000 | Crabtree et al. | | |
| 6,199,387 | B1 | | 3/2001 | Sauterleute | | |
| 6,257,003 | B1 | | 7/2001 | Hipsky | | |

FOREIGN PATENT DOCUMENTS

| DE | 199 35 918 | 2/2001 |
| GB | 2355520 | 4/2001 |

* cited by examiner

Primary Examiner—Melvin Jones
(74) Attorney, Agent, or Firm—Dilworth & Barrese LLP.

(57) ABSTRACT

The present invention relates to an air conditioning system for the air conditioning of a space, in particular for the air conditioning of an aeroplane cabin, comprising a heat exchanger for the cooling of a compressed air flow (tapped air flow) originating from an engine or an auxiliary unit and comprising at least one expansion device per air cycle machine (ACM) for the expansion and cooling of compressed air, wherein the expansion devices are disposed after the heat exchanger and are in connection on the outlet side with a mixing chamber or the space to be air conditioned. A high cooling performance is also achieved on the failure of one of the expansion devices or of an air cycle machine in that the heat exchanger is split into two heat exchanger units at the compressed air side whose inlets are each charged with compressed air, with the heat exchanger units being connected such that a flow of the compressed air from the outlet of the one heat exchanger unit to the other heat exchanger unit is prevented and with the heat exchanger units being able to be connected on the outlet side via a bypass line to the space to be air conditioned or to the mixing chamber or to the outlet of the air conditioning system.

21 Claims, 3 Drawing Sheets

AIR CONDITIONING SYSTEM

BACKGROUND OF THE INVENTION

The present invention relates to an air conditioning system for the air conditioning of a space, in particular for the air conditioning of an aeroplane cabin, comprising a heat exchanger for the cooling of a compressed air flow (tapped air flow) originating from an engine or an auxiliary unit and comprising at least one expansion device per air cycle machine (ACM) for the expansion and cooling of compressed air, with the expansion devices being disposed after the heat exchanger and being in connection with a mixing chamber or the space to be air conditioned on the outlet side.

Such air conditioning systems are required, for example, for the air conditioning of an aeroplane cabin in order to heat or to cool the cabin, to set the desired pressure level in the cabin and to provide passengers and crew with fresh air. Such previously known air conditioning systems for aeroplane cabins as a rule include a first heat exchanger and a second heat exchanger which pre-cool tapped air led out of the engines or out of the auxiliary engines, with the cooling performance of the heat exchangers being provided by means of blowers arranged in the stagnation air channel in ground operation and as a result of the stagnation pressure during flight. Furthermore, so-called air cycle machines (ACMs) are generally provided which consist of at least one turbine stage having a blower or—respectively and—a compressor which are fixedly arranged on a shaft. The compressor compresses the compressed air flowing from the first heat exchanger and then guided into the second heat exchanger. A high pressure water extraction circuit generally adjoins this, is disposed in front of the turbine and extracts a substantial part of the moisture from the compressed air before it is led into the turbine. The air dehumidified in this manner is expanded and cooled in the turbine, subsequently slightly heated by means of the high pressure water extraction circuit and subsequently led into a mixing chamber of the aeroplane. Here, the conditioned air is mixed with air of the aeroplane cabin guided in the circuit and subsequently supplied to the aeroplane cabin.

In particular when such air conditioning systems are used in aeroplanes, it is important that the system works largely free of error and that, in the event of an error, a substantial loss of performance or even a total failure can only occur with a very low probability. For these reasons, it has been proposed that the less reliable components such as the air cycle machine are doubly present and the reliable components such as the heat exchangers and the high pressure water extraction circuit are only provided once. Such an air conditioning system is known, for example, from U.S. Pat. No. 5,704,218.

The functioning of an air conditioning system with a doubly made air cycle machine and with a singly made high pressure water extraction circuit and singly provided heat exchangers will be explained with reference to FIG. 3:

Hot compressed air 1 (tapped air) is supplied to the system from the engines or an auxiliary unit at 1.5 to 3.5 bar and 150° C. to 230° C. In ground operation, the tapped air is extracted from an auxiliary engine and supplied to the system at approximately 3 bar. The tapped air flow is initially led through a primary heat exchanger (PHX) and hereby cooled to approximately 100° C. Approximately half of this compressed air in each case is compressed to approximately 4.5 bar in the compressor C1 (2) or in the compression C2 (3) respectively. The temperature of the compressed air flow which has been compressed amounts to approximately 160° C. After the merging 4, the compressed air flow is cooled to approximately 45° C. in the heat exchanger SHX.

The air is now led into the so-called high pressure water extraction circuit. This comprises a condenser CON and a heat exchanger REH disposed before the condenser. The water extractor WE is disposed after the condenser. The compressed and cooled tapped air is cooled by approx. 15° C. in the condenser and the condensed water is separated in the water extractor. The heat exchanger heats the air discharged from the water extractor by approx. 5° C., which is necessary to evaporate the remaining moisture present in the compressed air before the air is guided into the turbines. The heat exchanger furthermore has the task of correspondingly pre-cooling the compressed air before entry into the condenser.

After being discharged from the heat exchanger REH, the air stream is split up and around half in each case is guided into the turbine T1 (5) or T2 (6) respectively. The compressed air expands here to the cabin pressure of approx. 1 bar. The air is furthermore cooled down to approx. −30° C. at the turbine outlet. After the merging 7 of the expanded air streams, the air is led through the cold side of the condenser CON, with it being heated to approx. −15° C.

The air conditioned in this manner is mixed with recirculated cabin air in the mixing chamber 8 not shown in any more detail.

Each of the cooling turbine units ACM1, ACM2 (9, 10) consists of at least one turbine stage with a blower or compressor—in the example in accordance with FIG. 3 of the three wheels compressor 2, 3, turbine 5, 6 and blower 21, 22. These three wheels are fixedly connected to one another by the shaft. In ground operation, the blower 21, 22 and the compressor 2,3 are actively driven by the turbines 5, 6. In flight operation, the compressor takes up almost all the turbine performance. The stagnating air amount can optionally be restricted by controllable flaps 15, 16 at the inlet of the stagnating air channel 11 or at the outlet of the part channels 13. The heat exchangers SHX and PHX are arranged in the stagnating air channel 11. After flowing through the heat exchanger PHX, the stagnating air is split among the two part channels 13 at the point 12. After flowing through the part channels 13, the air flows back to the environment.

The temperature control of the cooled air supplied to the mixing chamber 8 takes place, as a rule, by means of one or two valves TCV 14 and the stagnating air flaps 15, 16.

A typical malfunction in the air conditioning system described in FIG. 3 is the failure of a cooling turbine unit (air cycle machine ACM). It must also be ensured in this case that a specific amount of cooled air and cooling performance are available. Two valves SOV1 and SOV2 17, 18 are provided for this purpose, by means of which the inlet sides of the turbines 5, 6 can be cut off. Furthermore, two check valves 19, 20 are provided in the region of the inlet of the compressors 2, 3.

If, for example, the cooling turbine unit 9 arranged at the top in FIG. 3 fails, the check valve 19 prevents the air compressed by the compressor 3 being in operation from flowing back via the compressor 2 and thus again being applied to the inlet side of the compressor 3. The check valve 19 prevents such a useless circulation flow. Furthermore, the valve SOV1 17 is closed so that the air compressed by the compressor 3 does not flow over the stationary turbine 5, but only over the functioning turbine 6 and is expanded here.

Since in the event of such a malfunction the required total air amount is nevertheless required, the functioning cooling turbine unit ACM2 (10) would now have to convey 100% of the air flow, which is, however, not possible since each ACM is only desired for approx. 50% of the required total air amount. It is therefore necessary to bypass the non-functioning cooling turbine unit by a bypass line. The valve TCV 14 is arranged in this bypass line and when it is opened, some of the tapped air 1 is fed directly in front of the condenser CON and then delivered to the mixing chamber 8.

Such a procedure has the disadvantage that the hot air flowing over the valve 14 is mixed with the cooled turbine air at the turbine outlet (after the mixing point 7), whereby the cooling performance of the system is correspondingly reduced. The loss in cooling performance must be compensated by larger heat exchangers (PHX, SHX), which corresponds to increased space requirements and weight. Both parameters are, however, subject to tight limits, in particular in aeroplane design, so that such a solution is unsatisfactory.

Alternatively to this, it would be conceivable to compensate the failure of an ACM in part in that both ACMs are oversized. It would be conceivable, for example, to design each of the ACMs for 70% of the total throughput. The disadvantage of a higher weight or higher dimensions of the ACMs also results in this case.

The above-described bypass of a cooling turbine unit ACM is not only required when this is defective, but also serves to increase the transmission of the air conditioning system. This is necessary since there is a tendency with aeroplane engines for the pressures for the tapped air to become lower and lower. The increase in the transmission is achieved via the valve TCV 14 with the above-described bypass. The disadvantage also exists in this case that hot air is mixed with the cold air from the turbine, which reduces the cooling performance correspondingly. In this case, too, the loss in cooling performance would have to be compensated by larger heat exchangers, which is, as indicated above, not wanted.

Both cases described above, that is the failure of an ACM and the further opening of the TCV to increase the transmission of the air conditioning system, result in the SHX which is mainly responsible for the heat discharge to the outside is only flowed through in part. The whole cooling potential of the SHX can thereby not be used, which has the disadvantage that this has to be compensated by larger heat exchangers PHX, SHX and corresponding increased weight.

SUMMARY OF THE INVENTION

It is therefore the object of the present invention to ensure a high cooling performance and transmission with an air conditioning system of the kind first mentioned even at low tapped air pressures and on the failure of an expansion device, with the weight, the dimensions and the costs of the air conditioning system having to be kept low and simultaneously a high reliability of the system being ensured.

This object is solved by an air conditioning system having the features described herein.

Accordingly, at least the SHX heat exchanger is divided at the compressed air side into two heat exchanger units whose inlets are each charged with compressed air, with the heat exchanger units being connected such that a flow of compressed air from the outlet of the one heat exchanger unit to the other heat exchanger unit is prevented, and with the heat exchanger units being connected at the outlet side via a bypass line to the space to be air conditioned or to the outlet of the air conditioning system or to a mixing chamber.

The advantage thereby results that, even on the failure of a turbine or ACM, the corresponding part of tapped air is guided through the heat exchanger or the associated heat exchanger unit and thus the total cooling capacity of the corresponding heat exchanger is utilised. Even on the failure of an expansion device or turbine or an ACM, the above-described ACM bypass is not required, which has the advantage that no hot air is mixed in at the turbine outlet. Furthermore, the transmission of the system is increased by the bypass of the air conditioning system in accordance with the invention, which is necessary with low tapped air pressures in flight. At the same time, the total cooling capacity of the heat exchanger is utilised.

In accordance with an advantageous aspect of the present invention, swing-type check valves are provided which are arranged in the outlet lines of the heat exchanger units and which prevent a flow of the compressed air from the outlet of the one heat exchanger unit to the other heat exchanger unit. If one of the expansion devices or turbines or a cooling air turbine unit ACM is defective, the swing-type check valves prevent the compressed air from being guided from the heat exchanger unit standing under pressure to the outlet side of the other heat exchanger unit and from there into the corresponding bypass line.

In accordance with a further preferred aspect, a first and a second compressor are provided whose outlets are in connection with one of the respective heat exchanger units.

The expansion devices can be designed as a first and a second turbine, with the first turbine being arranged on a respective shaft with the first compressor and the second turbine with the second compressor.

In addition to or instead of a compressor, a blower can be arranged on each of the shafts, said blower being disposed in a stagnating air channel of the air conditioning system. In this case, the cooling turbine units are designed as so-called three wheeled machines blower/compressor/turbine. Each ACM can, however, also consist of more than three wheels (e.g. blower+compressor+2 turbines).

More than one compressor and/or more than one turbine can be provided per air cycle machine.

The heat exchanger is preferably arranged in a stagnating air channel of the air conditioning system. In the flow direction of the stagnating air, a primary heat exchanger is disposed after this or parallel to it. With a primary heat exchanger disposed afterwards, the stagnating air thus flows through the SHX heat exchanger consisting, in accordance with the invention, of two heat exchanger units and subsequently through the primary heat exchanger.

Provision can further be made that the primary heat exchanger is separated into two primary heat exchanger units so that a primary heat exchanger unit is associated with each heat exchanger unit such that the stagnating air is guided into the associated primary heat exchanger unit after flowing through a heat exchanger unit.

A common or separate primary heat exchanger can be associated with the heat exchanger units and the stagnating air is guided through this after flowing through the heat exchanger units.

Provision can further be made that the stagnating air passage is separated into two part channels downstream of the primary heat exchanger and/or downstream of the heat exchanger, with a blower being arranged in each of the part channels downstream of the primary heat exchanger.

Whereas the heat exchanger is separated into two heat exchanger units at the compressed air side in accordance with the invention, provision can be made for the heat exchanger to be designed at the stagnating air side such that the stagnating air flows through the heat exchanger units together or separately.

In another aspect of the present invention, provision is made that the primary heat exchanger is charged at the inlet side with tapped air originating from the engine and is in connection with the compressors at the outlet side. The tapped air or compressed air is thus first led through the primary heat exchanger together or separately and subsequently delivered to the compressors.

It is particularly advantageous for a bypass line to be provided which respectively connects the inlet side and the outlet side of the compressor with one another and in which a swing-type check valve is arranged. This bypass line ensures that if the corresponding cooling turbine unit ACM fails, the cooled air being discharged from the primary heat exchanger is not guided over the non-functioning compressor, but through the bypass. A swing-type check valve in the bypass line prevents a circulation flow over the compressor in operation.

In another aspect of the present invention, provision is made that the primary heat exchanger at the compressed air side is designed such that the compressed air flows through this together or separately. The primary heat exchanger can, for example, like the heat exchanger on the compressed air side, be divided into two primary heat exchanger units. The same applies correspondingly to the stagnating air side.

Furthermore, a water extraction circuit can be provided which is in connection with the heat exchanger at the inlet side and with the expansion devices at the outlet side. The water extraction circuit effects the required high degree of dehumidification of the compressed air to be delivered to the turbines.

A cut-off valve can be respectively arranged between the expansion devices and the water extraction circuit. These cut-off valves serve the purpose of not charging the expansion device or turbine not in operation with compressed air, but to guide this exclusively over the working turbine to achieve the maximum possible cooling performance.

Provision can further be made that a bypass line with a cut-off valve is arranged which connects the heat exchanger with the inlets of the expansion device for the purpose of bypassing the water extraction circuit. In this case, the air flowing out of the heat exchanger units is delivered directly to the turbines, whereby the transmission of the system is correspondingly increased.

In another aspect of the present invention, two water extraction circuits are provided which are in connection with a respective heat exchanger unit at the inlet side and with a respective expansion device at the outlet side.

In accordance with a preferred embodiment of the present invention, sensors are provided by means of which a defect or failure of an expansion device or of the ACM can be detected.

The sensors can be designed as temperature sensors, pressure sensors or speed sensors.

Each air cycle machine can comprise at least one turbine stage with a blower or at least one compressor.

BRIEF DESCRIPTION OF THE DRAWINGS

Further details and advantages of the present invention will be explained in more detail with reference to an embodiment shown in the drawings. There are shown.

DESCRIPTION OF THE PREFERRED EMBODIMENTS

Figure 1:
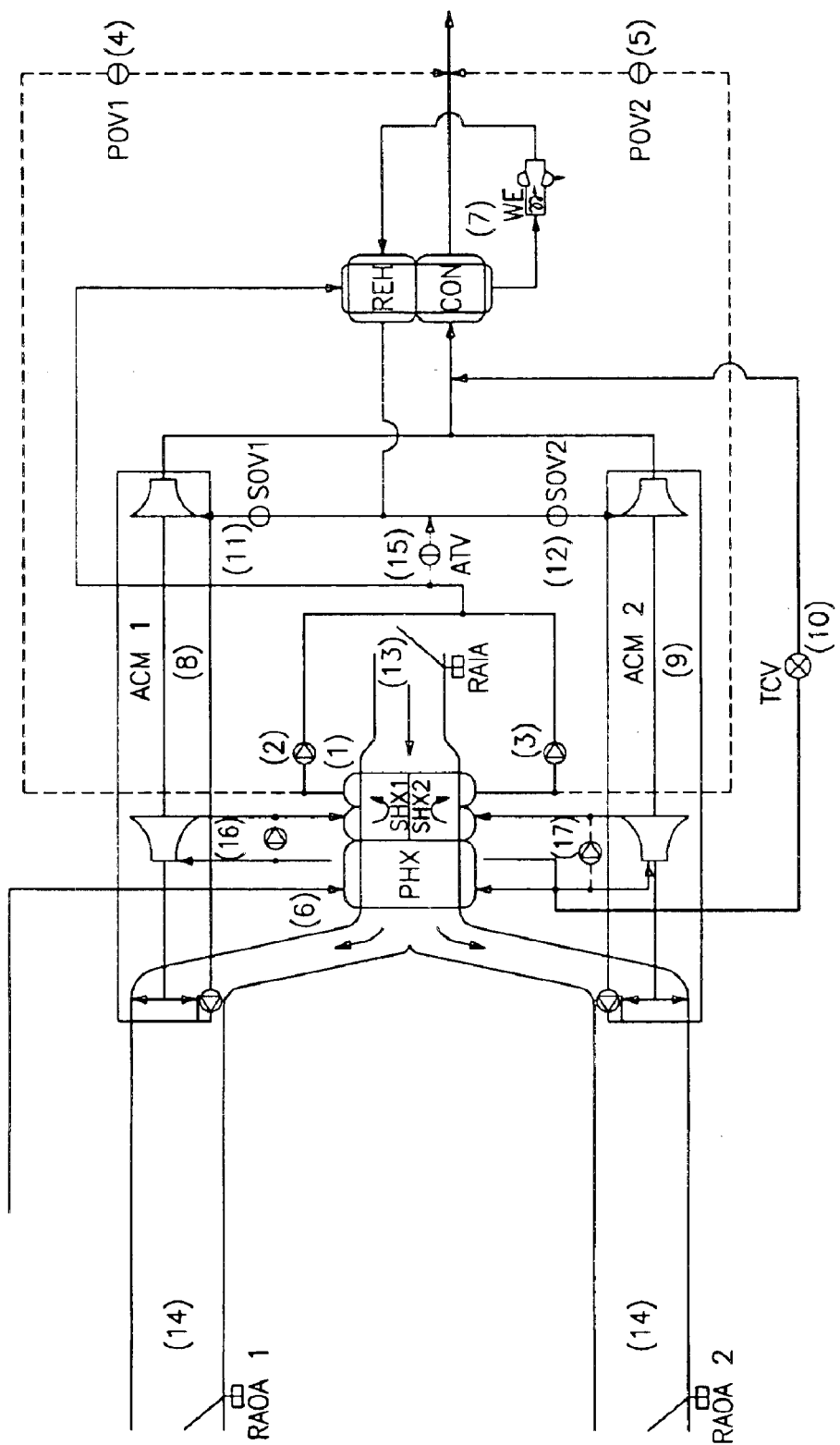
FIG. 1 a schematic representation of an air conditioning system in accordance with the present invention.

In accordance with FIG. 1, which shows an air-conditioning system in accordance with the present invention, the total tapped air is first supplied to the primary heat exchanger PHX 6. The pre-cooled air standing under pressure therein is subsequently supplied to the compressors C. The compressors C are fixedly arranged on a shaft as a three-wheeled machine with the turbines T and the blower. These cooling turbine units or air cycle machines ACM1 and ACM2 are characterised by the reference numerals 8 and 9.

After compression of the air in the compressors C, the air is delivered in accordance with the invention to the heat exchanger 1 separated into the heat exchanger units SHX 1 and SHX 2. The compressed air lines which are provided with swing-type check valves 2, 3 and through which the two air flows flowing out of the heat exchanger units SHX 1 and SHX2 are led together are disposed on the outlet side of these heat exchanger units. Furthermore, respective bypass lines are provided at the outlet sides of the heat exchanger units SHX1 and SHX2 and connect the heat exchanger units SHX1 and SHX2 to the outlet of the air conditioning system. The bypass valves BPV1 and BPV2 (4, 5), which are closed in normal operation, i.e. in the operation of both ACMs, are arranged in the bypass lines.

After passing through the swing-type check valves 2, 3, the compressed air is led together and delivered to the high pressure water extraction circuit 7 consisting of the heat exchanger REH, the condenser CON and the water extractor WE. The compressed air first flows through the heat exchanger REH in which it is pre-cooled. The pre-cooled compressed air is cooled further down in the condenser CON. Water is largely extracted from the air cooled in this manner in the water extractor WE. The remaining air flow is slightly heated over the heat exchanger REH to prevent the air supplied to the turbines T from being charged with water droplets.

The compressed air exiting the high pressure water extraction circuit is separated and delivered to the turbines T. The expansion and cooling of the compressed air takes place here. The expanded and cooled air is led together and finally led to the mixing chamber (not shown) via the cold side of the condenser CON.

Bypass lines are provided between the supply lines and take-away lines of the compressors C and a respective check valve 16, 17 is arranged in these. Furthermore, a bypass line with a cut-off valve 15 is provided which connects the outlet sides of the heat exchanger units SHX1 and SHX2 directly to the inlet sides of the turbines T. This bypass is not a necessity. However, the transmission is increased by it. The opening is only possible when the water extraction circuit is not needed (at flight altitudes above 30,000 ft.). Finally, the valves SOV1 and SOV2 are arranged in the region of the inlet sides of the turbines T, which are characterised by the reference numerals 11 and 12 and by means of which the turbines T not in operation can be separated from the air flow exiting the high pressure water extraction circuit.

A stagnating air channel is indicated by 13, by which air is guided through the heat exchanger unit SHX1, SHX2 and the primary heat exchanger PHX 6 by means of the blowers or due to the stagnating pressure which is sufficient in flight. Downstream of the primary heat exchanger 6, the stagnating air channel splits into part channels 14. The stagnating air amount can be controlled by means of corresponding restrictor valves at the inlet side and at the outlet side of the stagnating air channel 13, 14. The temperature control takes place by means of the stagnating air valves and of the valve TCV 10.

Figure 2:
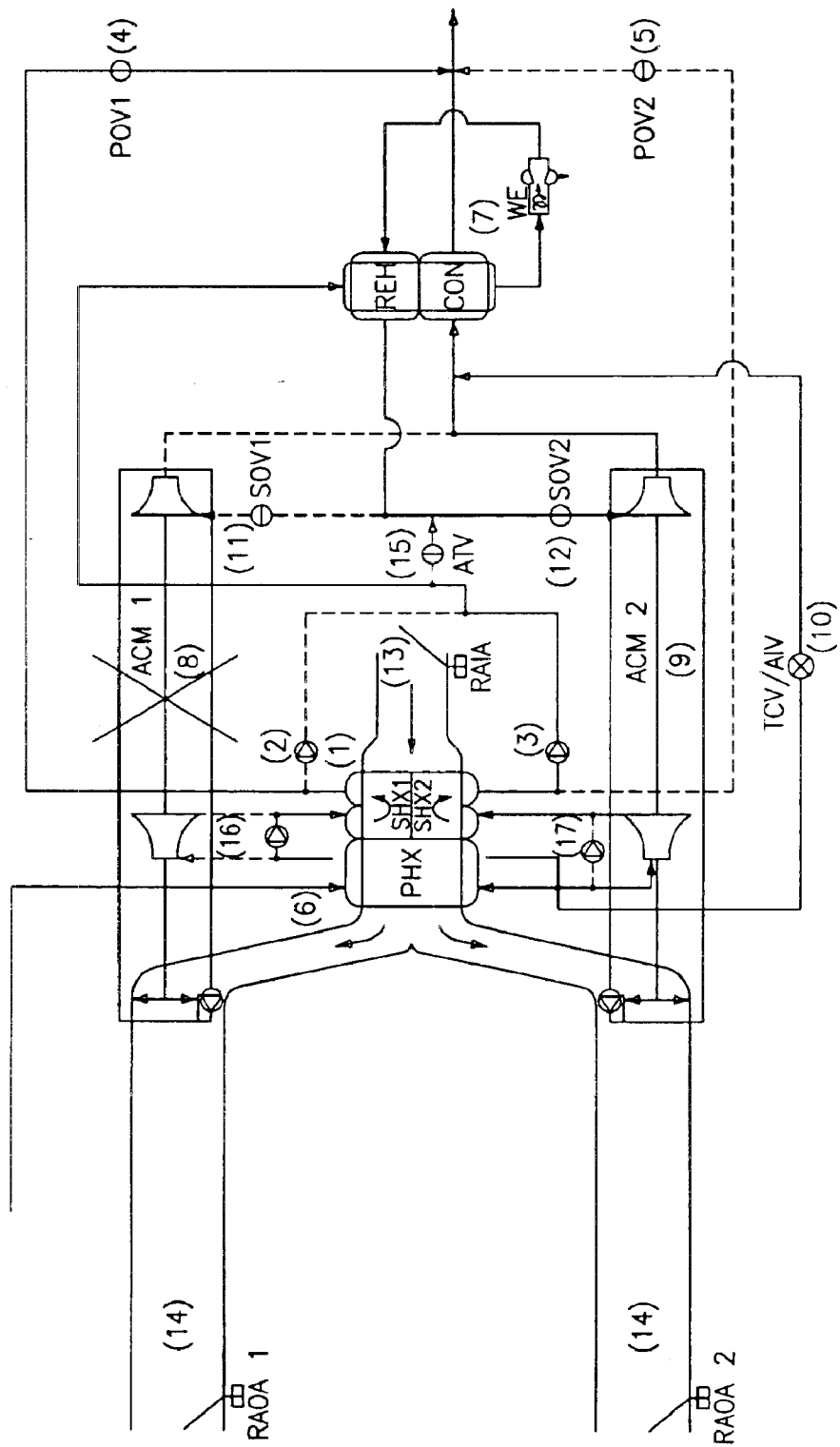
FIG. 2 a schematic representation of an air conditioning system in accordance with FIG. 1 with AMC1 not in operation.
Figure 3:
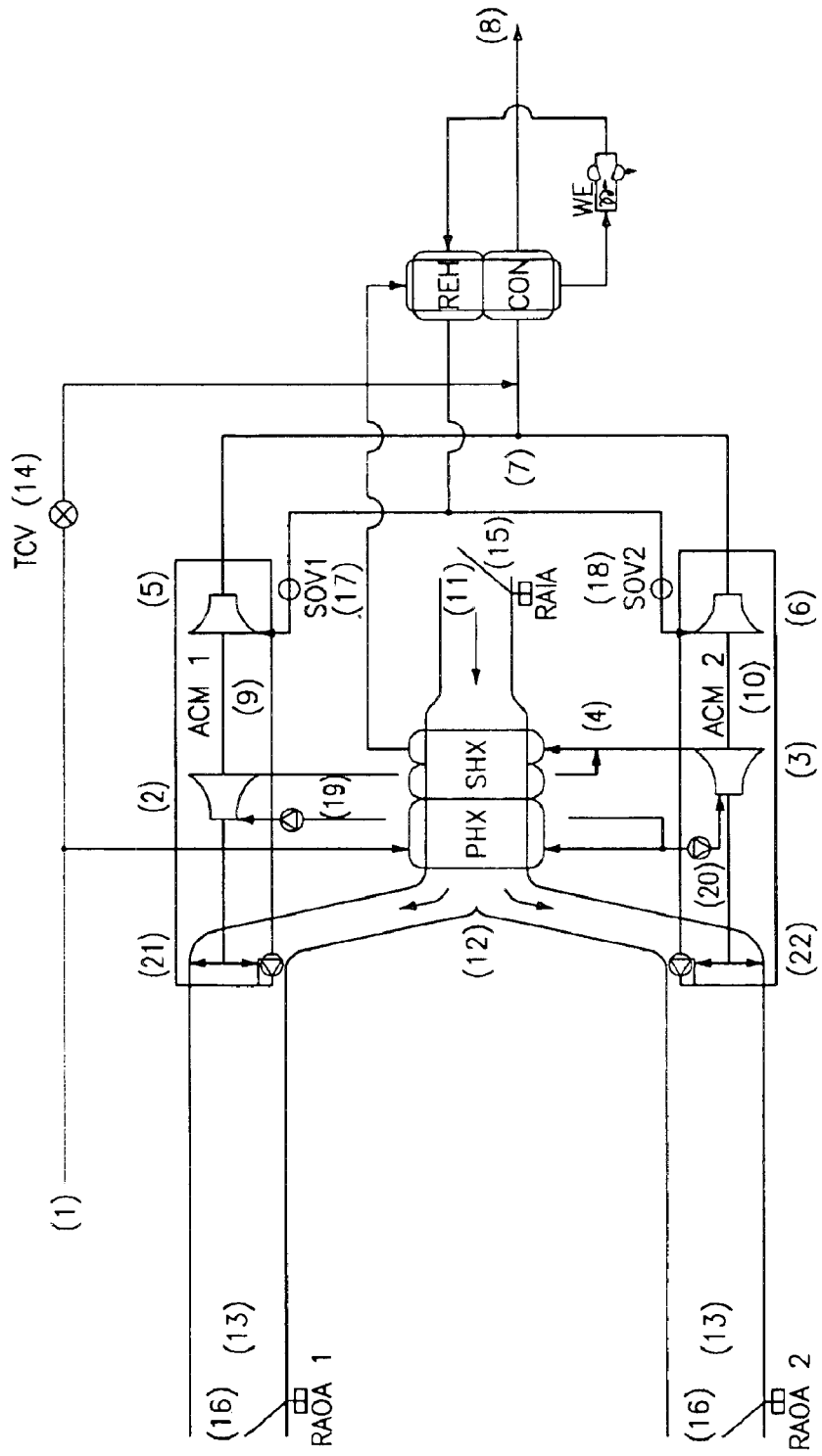
FIG. 3 a schematic representation of an air conditioning system in accordance with the prior art.

If now one of the air cycle machines ACM fails or if the transmission of the air conditioning system should be increased in flight, the state shown in FIG. 2 results. Here, for example, the air cycle machine ACM1 8 is put out of operation. As can be seen from FIG. 2, the air exiting the primary heat exchanger PHX 6 is not guided through the compressor C shown at the top, but supplied to the heat exchanger unit SHX1 while bypassing the compressor C by means of the bypass line with check valve 16 arranged thereunder. A flow-favourably bypass of the compressor C is thus achieved. This air now flows through the heat exchanger unit SHX1, while air compressed by the compressor C of the ACM 2 (9) shown at the bottom flows through the heat exchanger unit SHX2. The check valves 2 and 3 are arranged to prevent expansion at the outlet side of the heat exchanger units SHX1 and SHX2. In the state shown in FIG. 2, the check valve 2 prevents the compressed air which is under higher pressure and which exits the heat exchanger unit SHX2 from flowing to the output side of the heat exchanger unit SHX1 and then entering into the bypass line disposed there.

While the compressed air exiting the heat exchanger unit SHX2 passes through the high pressure water extraction circuit and the turbine T of the ACM2, as described with reference to FIG. 1, the air exiting the heat exchanger unit SHX1 flows via the bypass line directly to the output side of the high pressure water separation circuit. This bypass flow is made possible in that the valve BPV1 (4) of the bypass line is opened. The advantage hereby results with respect to the prior art that the air portion flowing through the bypass valve is likewise guided through the heat exchanger, i.e. in the present case through the heat exchanger SHX1, whereby the total cooling capacity of this heat exchanger is utilised, even if one of the air cycle machines has failed or is not in operation. Even when ACM fails, no bypass through the valve TCV is required.

As can further be seen from FIG. 2, the valve SOV1 is closed at the inlet side of the turbine T of the ACM1, whereby it is prevented that the air which is under pressure and exits the high pressure water extraction circuit is guided via the stationary turbine T, which would results in a heat loss. The aspect of the air conditioning system in accordance with the invention has the advantage that a high cooling performance is achieved even with an ACM not being in operation or having failed. A larger sizing of the air cycle machines ACM or of the heat exchangers is not required for this, which provides substantial advantages, in particular in aeroplane construction.

What is claimed is:

1. An air conditioning system for the air conditioning of a space, in particular for the air conditioning of an aeroplane cabin, comprising a heat exchanger (1) for the cooling of a compressed air flow (tapped air flow) originating from an engine or an auxiliary unit and comprising at least one expansion device per air cycle machine (ACM) for the expansion and cooling of compressed air, wherein the expansion devices are disposed after the heat exchanger (1) and are in connection on the outlet side with a mixing chamber or the space to be air conditioned, and the heat exchanger (1) is divided at the compressed air side into two heat exchanger units (SHX1 and SHX2) whose inlets are each charged with compressed air, with the heat exchanger units (SHX1, SHX2) being connected such that a flow of the compressed air from the outlet of the one heat exchanger unit to the other heat exchanger unit (SHX1, SHX2) is prevented, and with the heat exchanger units (SHX1, SHX2) being able to be connected on the outlet side via a bypass line to the space to be air conditioned or to the mixing chamber or to the outlet of the air conditioning system.

2. An air conditioning system in accordance with claim 1, wherein a first and a second compressor (C) are provided whose outlets are in connection with respectively one of the heat exchanger units (SHX1, SHX2).

3. An air conditioning system in accordance with claim 2, wherein the expansion devices are designed as a first and a second turbine (T), with the first turbine being arranged on a respective shaft with the first compressor and the second turbine with the second compressor.

4. An air conditioning system in accordance with claim 3, wherein a blower is arranged on each of the shafts, said blower being disposed in a stagnating air channel (14) of the air conditioning system.

5. An air conditioning system in accordance with claims 1, wherein more than one compressor and/or more than one turbine are provided per air cycle machine (ACM).

6. An air conditioning system in accordance with claim 4, wherein the stagnating air channel (13, 14) is divided into two part channels (14) downstream of the primary heat exchanger (6) and/or upstream of the heat exchanger (1), with a blower being arranged in each of the part channels (14) downstream of the primary heat exchanger (6).

7. An air conditioning system in accordance with claim 1, wherein the heat exchanger (1) is designed on the stagnating air side such that the stagnating air flows through the heat exchanger units (SHX1, SHX2) together or separately.

8. An air conditioning system in accordance with claim 1, wherein at least one water extraction circuit (7) is provided which is in connection with the heat exchanger (1) on the inlet side and with the expansion devices on the outlet side.

9. An air conditioning system in accordance with claim 8, wherein a cut-off valve (11, 12) is respectively arranged between the expansion devices and the water extraction circuit (7).

10. An air conditioning system in accordance with claim 8, wherein a bypass line with a cut-off valve (15) is provided which connects the outlet of the heat exchanger (1) to the inlets of the expansion devices for the purpose of bypassing the water extraction circuit (7).

11. An air conditioning system in accordance with claim 1, wherein each air cycle machine comprises at least one turbine stage with a blower or at least one compressor.

12. An air conditioning system for the air conditioning of a space, in particular for the air conditioning of an aeroplane cabin, comprising a heat exchanger (1) for the cooling of a compressed air flow (tapped air flow) originating from an engine or an auxiliary unit and comprising at least one expansion device per air cycle machine (ACM) for the expansion and cooling of compressed air, wherein the expansion devices are disposed after the heat exchanger (1) and are in connection on the outlet side with a mixing chamber or the space to be air conditioned, the heat exchanger (1) is divided at the compressed air side into two heat exchanger units (SHX1, SHX2) whose inlets are each charged with compressed air, with the heat exchanger units (SHX1, SHX2) being connected such that a flow of the compressed air from the outlet of the one heat exchanger unit to the other heat exchanger unit (SHX1, SHX2) is prevented, with the heat exchanger units (SHX1, SHX2) being able to be connected on the outlet side via a bypass line to the space to be air conditioned or to the mixing chamber or to the outlet of the air conditioning system, and swing-type check valves (2,3) are provided which are arranged in the outlet lines of the heat exchanger units (SHX1, SHX2) and which prevent a flow of the compressed air from the outlet of the one heat exchanger unit to the other heat exchanger unit (SHX1, SHX2).

13. An air conditioning system for the air conditioning of a space, in particular for the air conditioning of an aeroplane cabin, comprising a heat exchanger (1) for the cooling of a compressed air flow (tapped air flow) originating from an engine or an auxiliary unit and comprising at least one expansion device per air cycle machine (ACM) for the expansion and cooling of compressed air, wherein the expansion devices are disposed after the heat exchanger (1) and are in connection on the outlet side with a mixing chamber or the space to be air conditioned, the heat exchanger (1) is divided at the compressed air side into two heat exchanger units (SHX1, SHX2) whose inlets are each charged with compressed air, with the heat exchanger units (SHX1, SHX2) being connected such that a flow of the compressed air from the outlet of the one heat exchanger unit to the other heat exchanger unit (SHX1, SHX2) is prevented, with the heat exchanger units (SHX1, SHX2) being able to be connected on the outlet side via a bypass line to the space to be air conditioned or to the mixing chamber or to the outlet of the air conditioning system, the heat exchanger (1) is arranged in a stagnating air channel (11, 14) of the air conditioning system, and a primary heat exchanger (6) is disposed after the heat exchanger (1) in the flow direction of the stagnating air or the heat exchanger and the primary heat exchanger are arranged in parallel.

14. An air conditioning system in accordance with claim 13, wherein a primary heat exchanger unit is associated with each heat exchanger unit (SHX1, SHX2) such that the stagnating air is guided into the associated primary heat exchanger unit after flowing through a heat exchanger unit (SHX1, SHX2).

15. An air conditioning in accordance with claim 13, wherein a common or separate primary heat exchanger (6) is associated with the heat exchanger units (SHX1, SHX2) and the compressed air is guided through this after flowing through the heat exchanger units (SHX1, SHX2).

16. An air conditioning system in accordance with claim 13, wherein the primary heat exchanger (6) is charged with the tapped air originating from the engine on the inlet side and is in connection with the compressor (C) on the outlet side.

17. An air conditioning system in accordance with claim 16, wherein a bypass line is provided which connects the inlet side and the outlet side respectively of the compressor (C) to one another and in which a swing-type check valve (16, 17) is arranged.

18. An air conditioning system in accordance with claim 13, wherein the primary heat exchanger (6) is designed at the compressed air side such that the compressed air flows through this together or separately.

19. An air conditioning system for the air conditioning of a space, in particular for the air conditioning of an aeroplane cabin, comprising a heat exchanger (1) for the cooling of a compressed air flow (tapped air flow) originating from an engine or an auxiliary unit and comprising at least one expansion device per air cycle machine (ACM) for the expansion and cooling of compressed air, wherein the expansion devices are disposed after the heat exchanger (1) and are in connection on the outlet side with a mixing chamber or the space to be air conditioned, the heat exchanger (1) is divided at the compressed air side into two heat exchanger units (SHX1, SHX2) whose inlets are each charged with compressed air, with the heat exchanger units (SHX1, SHX2) being connected such that a flow of the compressed air from the outlet of the one heat exchanger unit to the other heat exchanger unit (SHX1, SHX2) is prevented, with the heat exchanger units (SHX1, SHX2) being able to be connected on the outlet side via a bypass line to the space to be air conditioned or to the mixing chamber or to the outlet of the air conditioning system, and two water extraction circuits are provided which are respectively in connection with a heat exchanger unit (SHX1, SHX2) on the inlet side and one of the expansion devices on the outlet side.

20. An air conditioning system for the air conditioning of a space, in particular for the air conditioning of an aeroplane cabin, comprising a heat exchanger (1) for the cooling of a compressed air flow (tapped air flow) originating from an engine or an auxiliary unit and comprising at least one expansion device per air cycle machine (ACM) for the expansion and cooling of compressed air, wherein the expansion devices are disposed after the heat exchanger (1) and are in connection on the outlet side with a mixing chamber or the space to be air conditioned, the heat exchanger (1) is divided at the compressed air side into two heat exchanger units (SHX1, SHX2) whose inlets are each charged with compressed air, with the heat exchanger units (SHX1, SHX2) being connected such that a flow of the compressed air from the outlet of the one heat exchanger unit to the other heat exchanger unit (SHX1, SHX2) is prevented, with the heat exchanger units (SHX1, SHX2) being able to be connected on the outlet-side via a bypass line to the space to be air conditioned or to the mixing chamber or to the outlet of the air conditioning system, and sensors are provided by which a defect or failure of an expansion device can be detected.

21. An air conditioning system in accordance with claim 20, wherein the sensors are designed as temperature sensors, pressure sensors or speed sensors.

* * * * *